United States Patent
Berger et al.

(10) Patent No.: US 8,099,352 B2
(45) Date of Patent: Jan. 17, 2012

(54) SYSTEM AND METHOD FOR TRADING FINANCIAL INSTRUMENTS BASED ON UNDISCLOSED VALUES

(75) Inventors: Eric Berger, Tel Aviv (IL); Christopher James Hodder, Philadelphia, PA (US); David Klein, Maale Adumim (IL)

(73) Assignee: Bloomberg L.P., New York, NY (US)

( * ) Notice: Subject to any disclaimer, the term of this patent is extended or adjusted under 35 U.S.C. 154(b) by 1352 days.

(21) Appl. No.: 11/263,622

(22) Filed: Oct. 27, 2005

(65) Prior Publication Data

US 2007/0100734 A1 May 3, 2007

Related U.S. Application Data

(60) Provisional application No. 60/622,527, filed on Oct. 27, 2004.

(51) Int. Cl.
*G06Q 40/00* (2006.01)

(52) U.S. Cl. .................. 705/37; 705/35; 705/36 T

(58) Field of Classification Search ............ 705/37, 705/36 T
See application file for complete search history.

(56) References Cited

U.S. PATENT DOCUMENTS

| | | | |
|---|---|---|---|
| 4,674,044 A | 6/1987 | Kalmus et al. | |
| 4,903,201 A | 2/1990 | Wagner | |
| 5,101,353 A | 3/1992 | Lupien et al. | |
| 5,136,501 A | 8/1992 | Silverman et al. | |
| 5,905,975 A | 5/1999 | Asubel | |
| 6,061,691 A | 5/2000 | Fox | |
| 6,243,691 B1 | 6/2001 | Fisher et al. | |
| 6,321,212 B1 | 11/2001 | Lange | |
| 6,442,258 B1 | 8/2002 | Mashinsky | |
| 6,546,375 B1 | 4/2003 | Pang et al. | |
| 7,680,715 B2 * | 3/2010 | Waelbroeck et al. | 705/35 |
| 7,693,775 B2 * | 4/2010 | Korhammer et al. | 705/37 |
| 2002/0082967 A1 | 6/2002 | Kaminsky et al. | |
| 2002/0178104 A1 * | 11/2002 | Hausman | 705/37 |
| 2002/0184136 A1 * | 12/2002 | Neubert et al. | 705/37 |
| 2003/0033235 A1 | 2/2003 | Hummelgren | |
| 2003/0093343 A1 * | 5/2003 | Huttenlocher et al. | 705/35 |

(Continued)

FOREIGN PATENT DOCUMENTS

EP 1 589 450 A1 10/2005

(Continued)

OTHER PUBLICATIONS

Written Opinion; Jun. 29, 2010; 6 pgs.

(Continued)

*Primary Examiner* — Jagdish Patel
*Assistant Examiner* — Kevin Poe
(74) *Attorney, Agent, or Firm* — Frank J. DeRosa; Frommer Lawrence & Haug LLP

(57) ABSTRACT

In electronic trading venues, there may be orders for which the full information is not publicly displayed. For example, the full quantity of an order available for trading or the most aggressive price at which an order can be traded may not be made public. A system and method are disclosed that facilitates trading based on this non-public information. A first order associated with a financial instrument is placed at a venue to probe for non-public information related to the financial instrument. The results of the probe may then be used to place a second order at the venue that takes advantage of any discovered non-public information.

20 Claims, 4 Drawing Sheets

U.S. PATENT DOCUMENTS

| | | | |
|---|---|---|---|
| 2004/0059666 A1 | 3/2004 | Waelbroeck et al. | |
| 2004/0143538 A1* | 7/2004 | Korhammer et al. | 705/37 |
| 2004/0236662 A1* | 11/2004 | Korhammer et al. | 705/37 |
| 2006/0136318 A1* | 6/2006 | Rafieyan et al. | 705/37 |
| 2006/0218071 A1* | 9/2006 | Sweeting | 705/37 |
| 2009/0192933 A1* | 7/2009 | Singer et al. | 705/37 |

FOREIGN PATENT DOCUMENTS

| | | |
|---|---|---|
| JP | 2002-183446 | 6/2002 |
| WO | WO 01/16830 | 3/2001 |
| WO | WO 2004/068272 | 8/2004 |

OTHER PUBLICATIONS

Supplemental Austrailian Written Opinion and Search Report for Singapore Appln. No. 0703099-2 mailed Aug. 19, 2009, 12 pgs.
European Patent Office Examination Report in counterpart European application No. 05824129.0 dated Feb. 4, 2010.
Written Opinion and Search Report in counterpart PCT Application No. PCT/US05/39674 dated Aug. 8, 2008.
Australian Patent Office Search Report, 4 pgs., Aug. 19, 2009.
Notification of Reasons for Refusal; Ref. No. X10-1148, dated Jul. 19,2011, Application No. 2007-539328, 5 pgs.

* cited by examiner

SYSTEM AND METHOD FOR TRADING FINANCIAL INSTRUMENTS BASED ON UNDISCLOSED VALUES

CROSS REFERENCE TO RELATED APPLICATION

This application claims the benefit of U.S. provisional patent application Ser. No. 60/622,527, "SYSTEMS AND METHODS FOR PROBING FOR HIDDEN LIQUIDITY AND FINANCIAL MARKETS", filed Oct. 27, 2004, the entire contents of which are hereby incorporated by this reference.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial interests. The trading of some financial interests is regulated, as for example by the United States Government, the various State governments, and other governmental agencies within the United States and elsewhere. The disclosure herein is made solely in terms of logical and financial possibility and advantage, without regard to possible statutory, regulatory, or other legal considerations. Nothing herein is intended as a statement or representation of any kind that any method or process proposed or discussed herein does or does not comply with any statute, law, regulation, or other legal requirement whatsoever, in any jurisdiction; nor should it be taken or construed as doing so.

BACKGROUND OF THE INVENTION

The invention relates to trading of financial instruments, and in particular to computer programs, methods, and systems for trading of financial instruments based on undisclosed values, e.g., undisclosed price and quantity values.

SUMMARY OF THE INVENTION

Hidden values of financial markets may exist in various forms. For example, in the equities market, sources of liquidity having hidden values may include orders with reserve, orders with discretion, hidden orders, odd lot orders, mixed orders, sub-penny orders and OTC orders.

Because hidden values may exist in several different types of orders (e.g., in the sources mentioned above), a user may wish to probe for hidden values to determine if they do indeed exist, where they are and to what degree. In certain situations, a user may wish to probe for hidden size or otherwise a quantity of financial instruments available for a trade at a listed price.

The system and method of the present invention enables the placement of orders for a financial instrument based on undisclosed (e.g., hidden) values (e.g., price and quantity values) associated with the financial instrument. For example, according to an embodiment of the present invention, hidden price and quantity values of the financial instrument are probed by placing a first order to determine a hidden price and/or hidden quantity of the financial instrument, and optionally placing a second order based on an execution of the first order in order to trade against the hidden price and/or hidden quantity so determined.

An embodiment of the invention provides a method for facilitating the trading of financial instruments. First, at least one computer placing a first order associated with a financial instrument in a venue in which the financial instrument is traded, the first order having terms such that execution of the first order reveals non-public information related to the financial instrument and the venue. In response to the first order being executed, the at least one computer automatically placing a second order associated with the financial instrument in the venue, the terms of the second order being based on the non-public information revealed by the execution of the first order.

According to an embodiment of the invention, the non-public information revealed by the execution of the first order describes an undisplayed quantity associated with the financial instrument and the venue.

According to another embodiment of the invention, the non-public information revealed by the execution of the first order describes an undisplayed price associated with the financial instrument and the venue.

According to another embodiment of the invention, a method is provided for facilitating the trading of financial instruments. First, at least one computer placing a first order associated with a financial instrument and a first of two transaction sides in a venue in which the financial instrument is traded, the first order having a price different from any disclosed prices of orders at the venue associated with the financial instrument and a second transaction side. Then, in response to the first order being executed for the entire quantity of the first order, the at least one computer automatically placing a second order associated with the financial instrument and the first transaction side in the venue at the same price at which the first order was executed.

In an embodiment of the invention, the first order has a first quantity and the second order has a second quantity larger than the first quantity.

In another embodiment of the invention, prior to the at least one computer placing the first order, the at least one computer receives a third order associated with the financial instrument and the first transaction side, the third order having a third quantity. Furthermore, the first quantity of the first order is derived from the third quantity of the third order.

In an embodiment of the invention, a method is provided for facilitating the trading of financial instruments. First, at least one computer places a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order. In response to the first order being executed against the second order for the entire quantity of the first order, the at least one computer automatically places a third order associated with the financial instrument and the first transaction side in the venue at the same price at which the first order was executed.

In an embodiment of the invention, the quantity of the third order is greater than the quantity of the first order.

According to another embodiment of the invention, prior to the at least one computer placing the first order, the at least one computer receives a fourth order associated with the financial instrument and the first transaction side. Furthermore, the quantity of the first order is derived from the quantity of the fourth order.

According to another embodiment of the invention, a method is provided for facilitating the trading of financial interests. First, at least one computer receives a first order associated with a financial instrument and a first of two transaction sides, the first order having a first quantity. Next, the at least one computer determines a price related to the financial instrument based on the prices associated with the financial instrument and the second transaction side disclosed by a plurality of venues in which the financial instrument is traded. Then, the at least one computer places a quantity probe order associated with the financial instrument and the first transaction side in one venue of the plurality of venues, wherein a second order in the one venue associated with the financial instrument and a second transaction side and the quantity probe order both have prices identical to the determined price, and wherein the quantity probe order has a quantity derived from the first quantity and that is greater than the quantity of the second order. Finally, the at least one computer places a price probe order associated with the financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

Another embodiment of the invention involves a system for facilitating the trading of financial interests comprising at least one computer programmed to perform the following: Place a first order associated with a financial instrument in a venue in which the financial instrument is traded, the first order having terms such that execution of the first order reveals non-public information related to the financial instrument and the venue. In response to the first order being executed, automatically place a second order associated with the financial instrument in the venue, the terms of the second order being based on the non-public information revealed by the execution of the first order.

Another embodiment of the invention involves a computer readable medium or media having programming stored thereon that when executed by at least one computer causes the at least one computer to: Place a first order associated with a financial instrument in a venue in which the financial instrument is traded, the first order having terms such that execution of the first order reveals non-public information related to the financial instrument and the venue. In response to the first order being executed, automatically place a second order associated with the financial instrument in the venue, the terms of the second order being based on the non-public information revealed by the execution of the first order.

Another embodiment of the invention relates to a system for facilitating the trading of financial interests comprising at least one computer programmed to: Place a first order associated with a financial instrument and a first of two transaction sides in a venue in which the financial instrument is traded, the first order having a price different from any disclosed prices of orders at the venue associated with the financial instrument and a second transaction side. In response to the first order being executed for the entire quantity of the first order, automatically place a second order associated with the financial instrument and the first transaction side in the venue at the same price at which the first order was executed.

According to another embodiment of the invention, a computer readable medium or media is provided having programming stored thereon that when executed by at least one computer causes the at least one computer to: Place a first order associated with a financial instrument and a first of two transaction sides in a venue in which the financial instrument is traded, the first order having a price different from any disclosed prices of orders at the venue associated with the financial instrument and a second transaction side. In response to the first order being executed for the entire quantity of the first order, automatically place a second order associated with the financial instrument and the first transaction side in the venue at the same price at which the first order was executed.

Another embodiment of the invention involves a system for facilitating the trading of financial interests comprising at least one computer programmed to: Place a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order. In response to the first order being executed against the second order for the entire quantity of the first order, automatically place a third order associated with the financial instrument and the first transaction side in the venue at the same price at which the first order was executed.

In another embodiment of the invention, a computer readable medium or media is provided having programming stored thereon that when executed by at least one computer causes the at least one computer to: Place a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order. In response to the first order being executed against the second order for the entire quantity of the first order, automatically place a third order associated with the financial instrument and the first transaction side in the venue at the same price at which the first order was executed.

According to another embodiment of the invention, a system is provided for facilitating the trading of financial interests comprising at least one computer programmed to: Receive a first order associated with a financial instrument and a first of two transaction sides, the first order having a first quantity. Determine a price related to the financial instrument based on the prices associated with the financial instrument and the second transaction side disclosed by a plurality of venues in which the financial instrument is traded. Place a quantity probe order associated with the financial instrument and the first transaction side in one venue of the plurality of venues, wherein a second order in the one venue associated with the financial instrument and a second transaction side and the quantity probe order both have prices identical to the determined price, and wherein the quantity probe order has a quantity derived from the first quantity and that is greater than the quantity of the second order. Place a price probe order associated with the financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

According to another embodiment of the invention, a computer readable medium or media is provided having programming stored thereon that when executed by at least one computer causes the at least one computer to: Receive a first order associated with a financial instrument and a first of two transaction sides, the first order having a first quantity. Determine a price related to the financial instrument based on the prices associated with the financial instrument and the second transaction side disclosed by a plurality of venues in which the financial instrument is traded. Place a quantity probe order associated with the financial instrument and the first transaction side in one venue of the plurality of venues, wherein a second order in the one venue associated with the financial instrument and a second transaction side and the quantity probe order both have prices identical to the determined price, and wherein the quantity probe order has a quantity derived from the first quantity and that is greater than the quantity of the second order. Place a price probe order associated with a financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

BRIEF DESCRIPTION OF THE FIGURES

The invention is illustrated in the figures of the accompanying drawings, which are meant to be exemplary and not limiting, and in which like references are intended to refer to like or corresponding parts.

DETAILED DESCRIPTION

Figure 1:
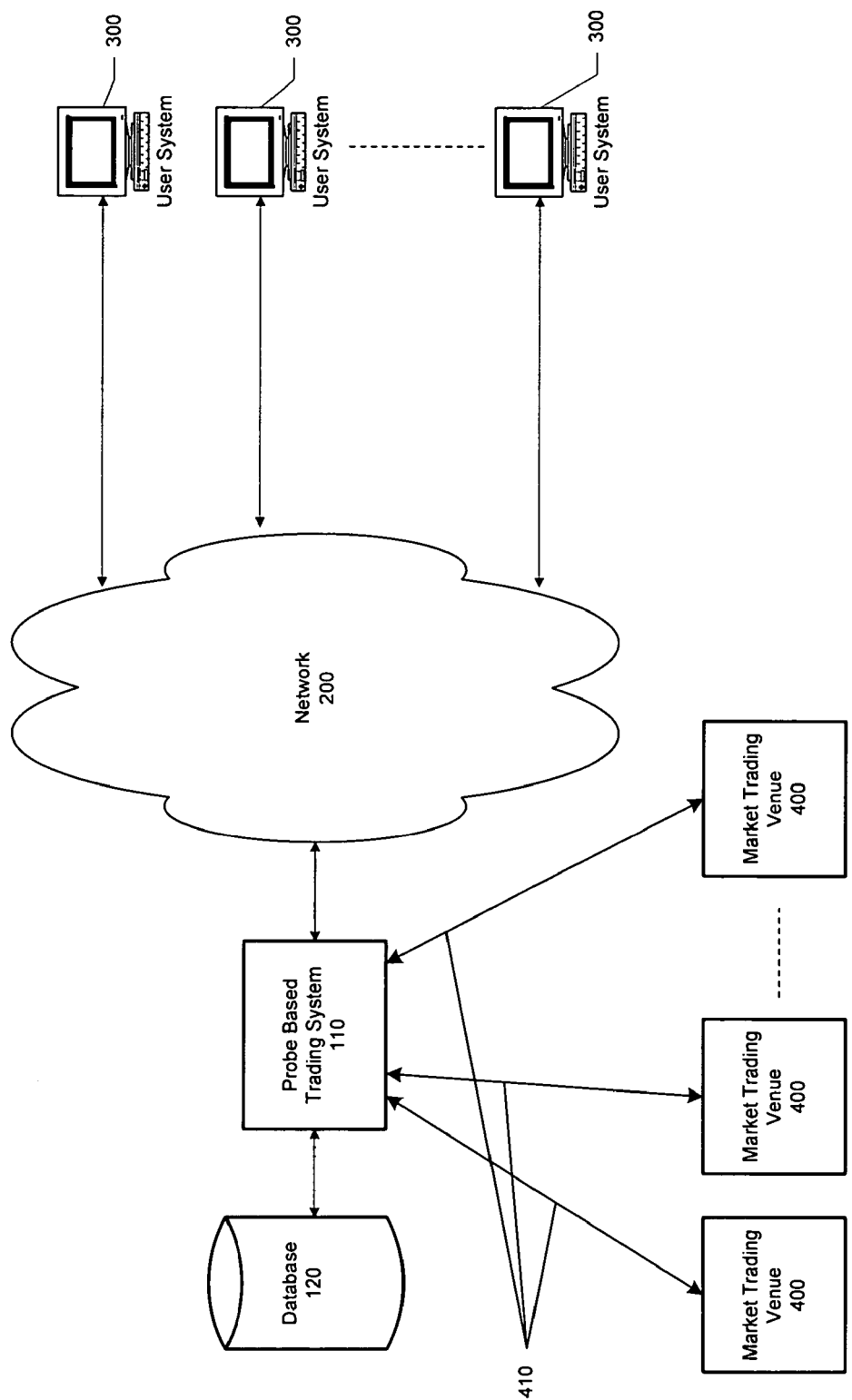
FIG. 1 is a block diagram of an embodiment of the system of the present invention showing the environment in which the system operates.

FIG. 1 is a block diagram showing an embodiment of the Probe-Based Trading ("PBT") System of the present invention and the environment in which it operates. As shown in FIG. 1, the PBT System 110 of the present invention communicates with one or more users at User Systems 300 through Network 200. PBT System 110 also is in communication with one or more Market Trading Venues 400 (via computers within each of those venues) and Database 120.

Network 200 may comprise any communications network or other means through which computers may communicate with each other, including, but not limited to, one or more of the following: private, dedicated telecommunication lines, wired or wireless LANs and WANs, and the Internet. Also, although Network 200 is shown in FIG. 1 as a single network, it should be understood that First Network 200 may comprise a plurality of networks in communication with each other.

User Systems 300 enable users to interact with PBT System 110 through Network 200. Users may include traders of financial instruments or agents working on behalf of traders. Financial instruments may include any item that may be traded in a market, such as, for example, equity securities, e.g., stocks, fixed income securities, e.g., bonds, commodities, energy contracts, and foreign currencies. User Systems 300 may comprise any computers that enable users to enter and send data to and receive and view data from PBT System 110 via Network 200, such as, for example, personal computers equipped with software that provides a graphical user interface ("GUI") through which trading data is presented to and received from the user.

Market Trading Venues 400 represent markets in which financial instruments are traded, e.g., the New York Stock Exchange ("NYSE"), the National Association of Securities Dealers Automatic Quotation System ("NASDAQ") via SuperMontage ("SM"), and Electronic Communication Networks ("ECNs") such as Archipelago ("ARCX"), Brut, Bloomberg TradeBook®, and Instinet ("INET"). Each Market Trading Venue 400 includes one or more computers that handle trading within the venue and communication with other venues and other computers. Communication links 410 between the Market Trading Venues 400 and PBT System 110 enable PBT System 110 to send to and receive from Market Trading Venues 400 data related to financial instruments and proposed trades involving financial instruments traded in the respective markets of the Market Trading Venues 400. Communication links 410 may include any means through which computer systems may exchange data, including means such as those described above for Network 200.

As mentioned above, PBT System 110 enables users at User Systems 300 to trade financial instruments in the markets corresponding to Market Trading Venues 400 based on undisclosed values. In an embodiment of the present invention, PBT System 110 may comprise any computer that facilitates trading of financial instruments based on undisclosed values by (a) placing a first order associated with a financial instrument at a Market Trading Venue, the first order being associated with a financial instrument and a first of two transaction sides (e.g., buy or sell side) and having a certain price and quantity (as described further below), and (b) if the first order is executed for its entire quantity, automatically placing a second order associated with the financial instrument and the first transaction side at the Market Trading Venue at the same price at which the first order was executed.

PBT System 10 may comprise a computer including hardware and/or computer code that enables the computer to perform the functionality mentioned above and described in detail below. For example, PBT System 10 may comprise a computerized trading system, such as the TRADEBOOK® system available over the BLOOMBERG PROFESSIONAL® Service, that provides the functionality described below. In another example, PBT System 10 may comprise an order management system, such as BLOOMBERG Sell Side Equity Order Management System ("SSEOMS"), with the capability of routing orders to various Market Trading Venues, as described below.

Referring again to FIG. 1, PBT System 10 is also in communication with Database 120 such that PBT System 110 can store data in and retrieve data from Database 120. For example, Database 120 may reside in the same computer system as PBT System 110 or Database 120 may reside in a separate computer system that has communication links with PBT System 110. Database 120 stores all the orders entered by the users associated with PBT System 110. Database 120 may also store user configuration information such as the identities and order of priority of Market Trading Venues 400 eligible for probing.

Figure 2:
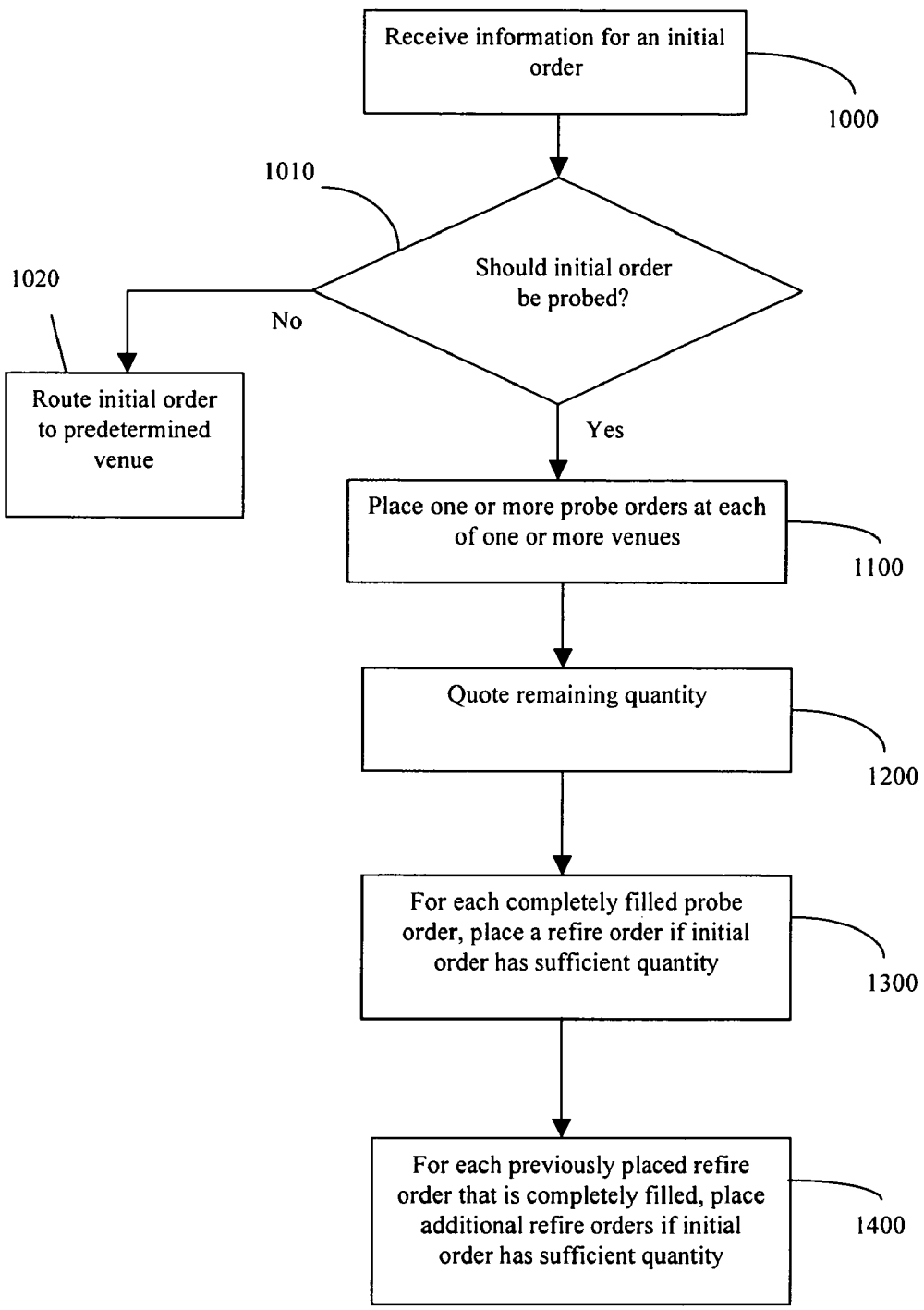
FIG. 2 is a flowchart showing an operative embodiment of the present invention.

FIG. 2 is a flowchart showing one way in which the PBT System 110 of the present invention may operate. First, as represented in block 1000, information describing a first order is received at PBT System 10. This first order may be referred to as an "initial order." The information describing the initial order may include information identifying the financial instrument with which the order is associated (e.g., where the financial instrument is a stock, the identifying information may be a ticker symbol), a transaction side with which the order is associated (e.g., buy side or sell side), a price, and a quantity.

This information describing the initial order may also include other information characterizing the order. For example, the initial order may be characterized as a pegged order and/or an order with discretion. Such characteristics may require additional information to be provided. For example, if the initial order is characterized as a pegged order, such additional required information may include the price to which the price of the initial order is to be pegged (e.g., the market price of the financial instrument with which the initial order is associated) and an amount by which the price of the initial order is offset from the pegged price. Where the initial order is characterized as an order with discretion, such additional required information may include (a) an upper price range (e.g., +$0.50) or a lower price range (e.g., −$0.50) depending on whether the initial order is associated with the buy side (e.g., the initial order is a bid) or with the sell side (e.g., the initial order is an offer), respectively, and (b) a trigger quantity (a trigger quantity of zero indicates there is no trigger quantity). Trigger quantity may refer to a quantity threshold which must be met in order for an order with discretion to be executed. For example, if a buy order with discretion having a trigger quantity of 300 shares has been placed in a Market Trading Venue, sell orders in that venue having quantities (disclosed or undisclosed) of less than 300 shares will not be executed against the buy order even if the prices associated with those sell orders fall within the price discretion of the buy order.

It should be noted that although all currency amounts described herein refer to U.S. Dollars, the invention is not limited to U.S. Dollars and other currencies may be used as well.

The information describing the initial order may also include information identifying other functionality associated with the order. For example, the initial order may be identified as a single layer bang ("SLB") order or a multi-layer bang ("MLB") order. SLB and MLB refer to functionality provided in Bloomberg TRADEBOOK®. The SLB function sends orders first to the market makers/ECNs at the inside price, until they fill or drop out, and then to those at the next price level. MLB sends orders to market makers/ECNs at all price levels, up to the order's limit, at the same time.

The information mentioned above that describes the initial order may be received by PBT System 110 from a variety of sources. For example, this information may be received as data from another computer.

Alternatively, the information may be provided manually by a user. For example, PBT System 110 may present to a user at a User System 300 a graphical user interface ("GUI"), such as GUI 101 of FIG. 3, with which the user can interact to enter the information describing the initial order as mentioned above.

Figure 3:
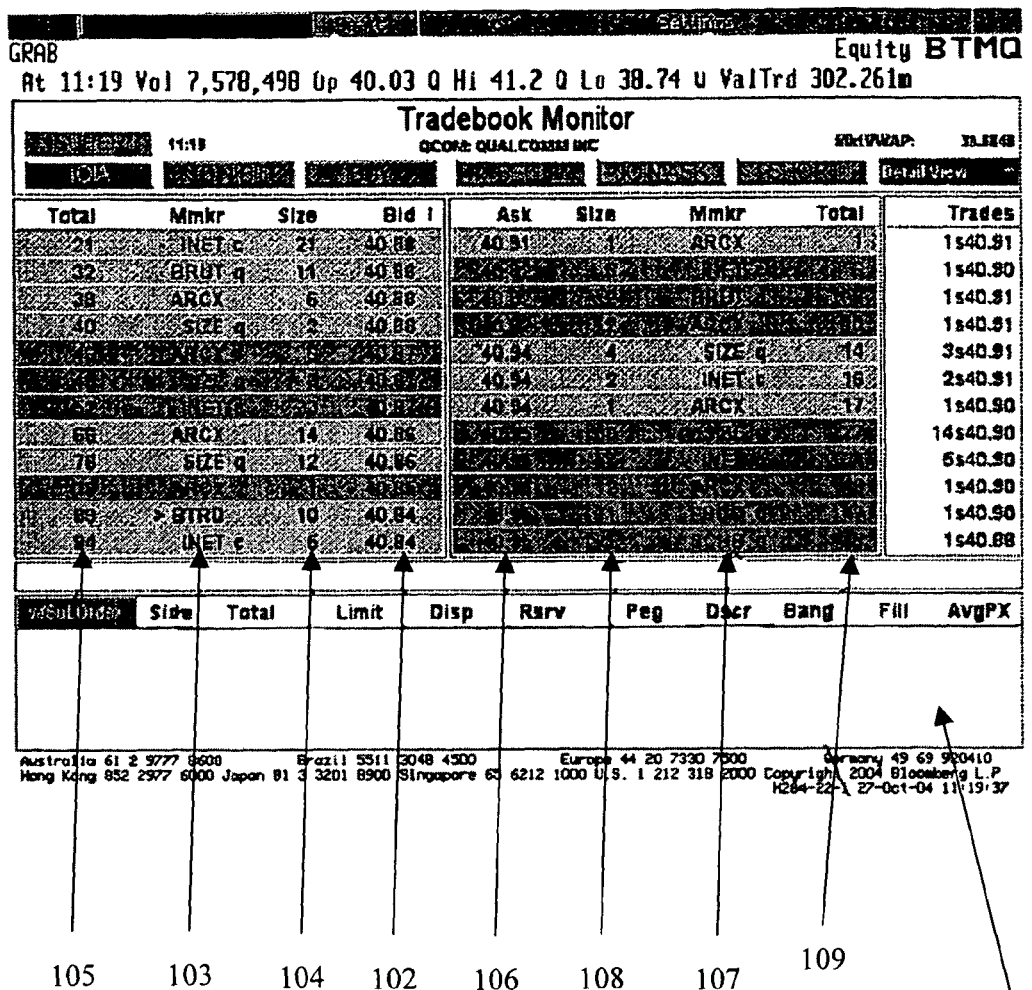
FIG. 3 is an example of a graphical user interface capable of being used with the present invention.

As can be seen in FIG. 3, a user may determine from GUI 101 the trading posture of a particular financial instrument disclosed in a Market Trading Venue 400 (e.g., Bloomberg TRADEBOOK® listed as "BTMQ" in GUI 101) by viewing bid column 102 and size column 104. Bid column 102 shows the bid price for a particular security (in this case Qualcomm) in descending order with the corresponding lot size for each price level displayed in column 104. Similarly, Ask column 106 shows the asking price for a particular security in ascending order with the corresponding lot size for each price level displayed in column 108.

The aggregate volume of shares that may be purchased or sold is reflected by the values in columns 105 and 109. For example, the last entry in column 105 illustrates the sum of Qualcomm shares looking to be purchased at the listed prices (although additional bids may exist at lower prices). Column 109 performs a similar function for shares that are for sale.

Columns 103 and 107 list the market makers responsible for the corresponding bids and asks.

GUI 101 also shows user controls, such as the "BUY" and "SELL" buttons near the top of the screen. By selecting these controls, a user would be presented with further interactive elements, e.g., dialog boxes with further user controls (not shown), that would enable the user to enter the information describing the initial order mentioned above Referring again to FIG. 2, after the information describing the initial order is received in block 1000, the PBT System 110 determines whether the initial order should be probed, as represented in Block 1010. For example, certain types of orders may be excluded from probing such that when an order of that type is received, the PBT System 110 does not perform any of the functionality described below, but rather routes the order directly to a predetermined venue, as represented in block 1020. For instance, the PBT System 110 may allow users to specify certain types of orders (e.g., pegged orders) to be excluded from probing such that, when the PBT System 110 receives an initial order of the specified type, the order will be routed directly to a venue selected by the user.

In another example, due to regulatory requirements, certain embodiments of PBT System 110 would send initial orders of certain types directly to certain venues and would forgo sending probe orders based on those initial orders to any venues. For instance, where PBT System 110 is in the form of a computer capable of routing orders to venues such as Bloomberg SSEOMS, and is not the trading system component of a broker-dealer such as Bloomberg TRADEBOOK®, then PBT System 110 may be required to route initial orders that are pegged orders and non-marketable orders without discretion directly to SuperMontage.

If the initial order is not directly routed to predetermined venue, then operation continues with block 1100 where the PBT System 110 places one or more orders at each of one or more Market Trading Venues 400. These orders, which may be referred to as "probe" orders, are used to determine whether a venue has hidden prices and/or hidden quantity, as described below. These probe orders may be based on the initial order in that the probe orders will be associated with the same financial instrument with which the initial order is associated and the price and quantity of each probe order will be derived from the price and quantity of the initial order, as described below.

Figure 4:
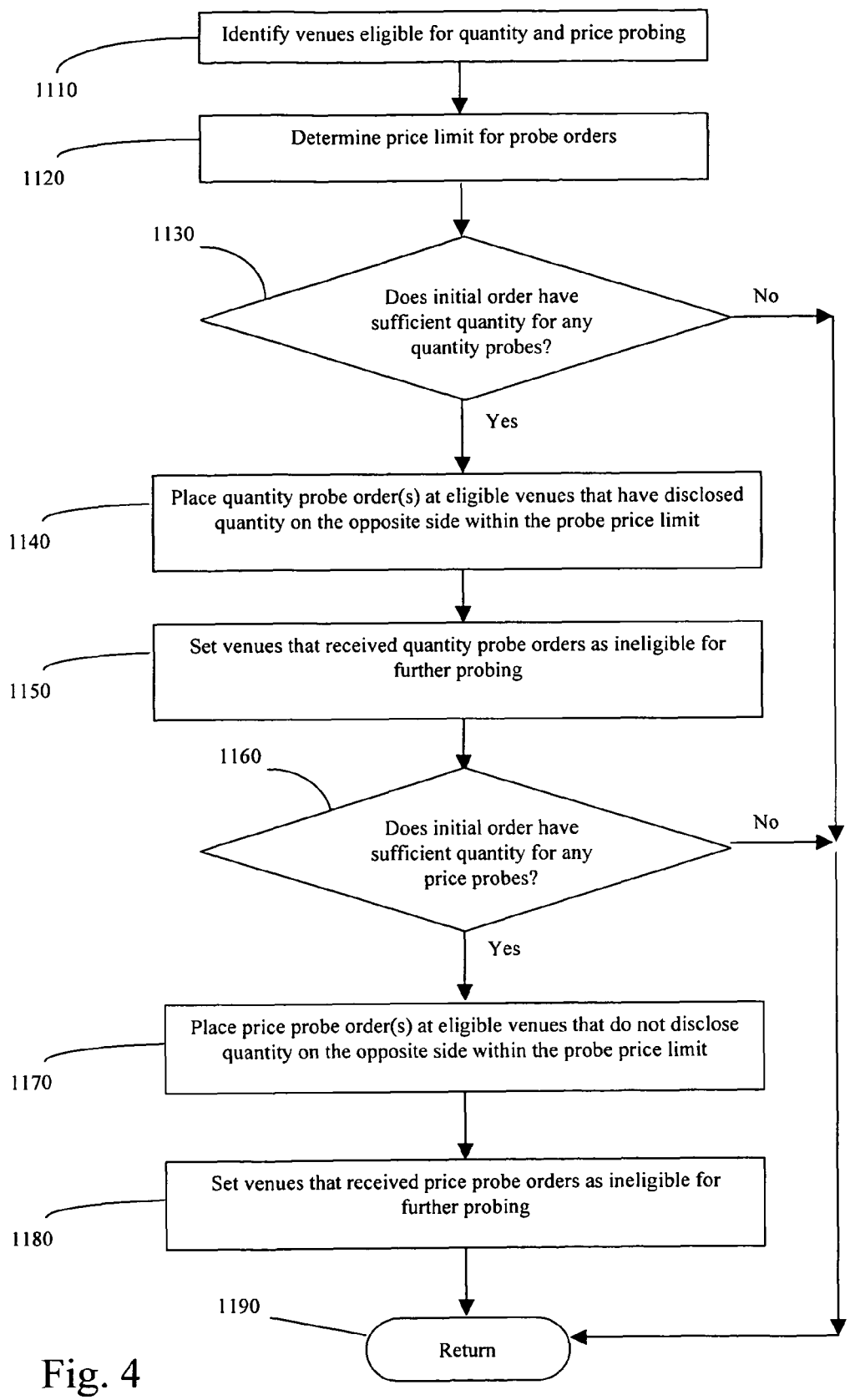
FIG. 4 is flowchart showing another operative embodiment of the present invention.

One way in which the operations represented in block 1100 of FIG. 2 may be performed is depicted in the flowchart of FIG. 4. First, as represented in block 1110, PBT System 110 identifies all venues eligible for quantity probing and price probing. Quantity probing refers to determining whether undisclosed quantity exists at a venue that displays quantity at a particular price. Price probing refers to determining whether undisclosed quantity exists at a venue that is not displaying any quantity at that price. Quantity probing and price probing are independent of each other and can each be done separately.

In an embodiment of the invention, all Market Trading Venues 400 in which the financial instrument associated with the initial order are traded are eligible for quantity probing. In another embodiment, PBT System 110 may allow a user to select which venues are eligible for quantity probing and to define the order in which they will be probed. For example, a user may specify that INET, ARCX, BRUT and SM are eligible for quantity probing in that order.

In an embodiment of the invention, all Market Trading Venues 400 in which the financial instrument associated with the initial order are traded are eligible for price probing. In another embodiment, PBT System 110 may allow a user to select which venues are eligible for price probing and to define the order in which they will be probed. For example, a user may specify that INET, ARCX, BRUT and SM are eligible for price probing in that order.

Next, PBT System 110 determines the price limit for probe orders, as represented in block 1120. PBT System 110 determines this price limit based on the price of the initial order and other characteristics of the initial order that affect price.

For example, if an initial order is marketable by virtue of its given price alone or its given price combined with a discretion range, then the price limit for probe orders based on that initial order may be set at the best disclosed price on the opposite transaction side for all venues. For instance, where INET and SM disclose offers for 300@$30.03 and 1000@$30.04, respectively, an initial order to buy 30,000@$30.05 would be marketable. In the same example, an initial order to buy 30,000@$30.02 with discretion of +$0.01 and a trigger quantity of 300 or less would also be marketable. Consequently, the price limit for probe orders based on these initial orders would be $30.03, which is the best disclosed price on the sell side for all venues.

In another example, if the initial order is not marketable, then the price limit for probe orders based on that initial order may be set at the initial order's given price or, if the initial order has discretion, the initial order's given price combined with the discretion range. For instance, where INET and SM disclose offers for 300@$30.03 and 1000@$30.04, respectively, an initial order to buy 30,000@$30.00 would be non-marketable and the price limit for probe orders based on this initial order would be the initial order's price of $30.00. An initial order to buy 30,000@$30.00 with a discretion of $+0.01 would also be non-marketable and the price limit for probe orders based on this initial order would be the initial order's price combined with the discretion range or, in this case, $30.01.

After the price limit for probe orders is determined, another determination may be made as to whether the initial order's quantity is sufficient to place any quantity probes, as represented in block 1130. As described further below, to place a quantity probe at a given venue, the initial order's quantity must be greater than the quantity disclosed at the venue within the probe price limit. For example, if INET shows an offer for 3,000 at the probe price limit of $30.03, an initial order to buy for 1,000@$30.05 would not have sufficient quantity to support a quantity probe at this venue.

If the determination from block 1130 is negative, then operation of PBT System 110 returns (via block 1190) to the operations represented in block 1200 of FIG. 2, described below.

If the determination from block 1130 is positive, then operation of PBT System 110 continues with the operations represented in block 1140 of FIG. 4, placing one or more quantity probe orders at one or more Market Trading Venues 400 that were identified as eligible for quantity probing and that have disclosed quantity on the transaction side opposite the transaction side of the initial order at a price within the probe price limit previously determined. Each quantity probe order is associated with the same financial instrument and transaction side as the initial order, has a price matching the price of the disclosed quantity of the venue to which the quantity probe order will be placed, and has a quantity equal to this disclosed quantity increased by a predetermined amount. In an embodiment of the invention, this predetermined amount is the smallest amount of the financial instrument tradable in the venue. For example, where the financial instrument is a stock, this predetermined amount may be 100 shares. Alternatively, this predetermined amount may be user configurable.

Each quantity probe order may be placed as an immediate or cancel ("IOC") order so that any amount of the quantity probe order not immediately executed is canceled. Thus, the placed quantity probe orders do not themselves create liquidity in the venues at which they are placed.

As stated above, one or more quantity probe orders may be placed at a given venue. For example, as described further below, where an initial order is associated with the single layer bang functionality of Bloomberg TRADEBOOK®, only one quantity probe order (e.g., at the probe limit price) is sent to a venue.

Also, as stated above, quantity probe orders may be placed at one or more venues. If the initial order has sufficient quantity, one or more quantity probe orders are sent to each Market Trading Venues 400 in the manner described above. However, if the initial order does not have sufficient quantity for this, then the placement of quantity probe orders is prioritized first based on price (e.g., where quantity probe orders are placed at various prices such as where an initial order is associated with the multi-layer bang functionality of Bloomberg TRADEBOOK®) and then according to the venue order provided by the user, as described above in connection with the operations represented by block 1110.

In an embodiment of the invention, each venue that received quantity probes are marked as ineligible for receiving further probing, as represented in block 1150. Specifically, each venue so marked is ineligible for probing at the probe price limit or less aggressive limits (e.g., a higher limit on the sell side or a lower limit on the buy side) until certain conditions occur. These conditions may include, for example, (a) a venue receiving a complete fill for a quantity or price probe order or a refire order (described further below), or (b) a venue quoting additional quantity at the probe price limit or a more aggressive price.

Following the placement of quantity probe orders, a determination may be made as to whether the initial order has sufficient remaining quantity for the placement of price probe orders, as represented in block 1160. The threshold which the remaining quantity must exceed for the placement of price probe orders to take place may be a predetermined amount (e.g., 500 shares where the financial instruments being traded are a stocks) or it may be user configurable. If the determination is negative, then operation of PBT System 110 returns (via block 1190) to the operations represented in block 1200 of FIG. 2, described below.

If the determination of block 1160 is positive, then operation of PBT System 110 continues with the operations represented in block 1170, with placing a price probe order at one or more Market Trading Venues 400 that were identified as eligible for price probing and that have no disclosed quantity on the transaction side opposite the transaction side of the initial order at a price within the probe price limit previously determined. Each price probe order is associated with the same financial instrument and transaction side as the initial order, has a price at the probe price limit, and has a quantity of a predetermined amount. In an embodiment of the invention, this predetermined amount is the smallest amount of the financial instrument tradable in the venue. For example, where the financial instrument is a stock, this predetermined amount may be 100 shares. Alternatively, this predetermined amount may be user configurable. In addition, each price probe order may be placed as an IOC order.

Also, as stated above, price probe orders may be placed at one or more venues. If the initial order has sufficient quantity, price probe orders are sent to each Market Trading Venues 400 in the manner described above. However, if the initial order does not have sufficient quantity for this, then the placement of price probe orders is prioritized according to the venue order provided by the user, as described above in connection with the operations represented by block 1110.

In an embodiment of the invention, each venue that received price probes are marked as ineligible for receiving further probing, as represented in block 1180. Specifically, each venue so marked is ineligible for probing at the probe price limit or less aggressive limits until certain conditions occur, such as those mentioned above in connection with block 1150.

Following the operations represented in block 1180, operation of the PBT System 110 returns (via block 1190) to the operations represented in block 1200 of FIG. 2, described below.

Although, in the embodiment of the invention shown in FIG. 4, quantity probe orders are placed prior to the placement of price probe orders, this order is not required and in other embodiments of the invention the order in which quantity probe and price probe orders are placed may be reversed.

Returning to FIG. 2, following the placement of probe orders, the quantity remaining of the initial order is quoted, as represented in block 1200. For example, where PBT System 110 is the computerized trading system of a broker-dealer, such as Bloomberg TRADEBOOK®, the remaining quantity of the initial order may be quoted on this system and may be given known trading characteristics, e.g., known anti-lock and display/reserve settings.

Then, for each quantity or price probe order that is completely filled (e.g., executed for the full amount of the probe order), PBT System 110 automatically places another order (which may be referred to as a "refire" order) at the same venue in which the respective probe order was executed if the initial order has sufficient remaining quantity, as represented in block 1300. The refire order is given the price at which the respective probe order was executed. Also, the refire order is given a predetermined quantity (e.g., 10,000 shares if the financial instruments being traded are equities) up to the remaining quantity of the initial order. In an embodiment of the invention, this predetermined amount is user configurable.

Then, as represented in block 1400, for each previously placed refire order that is completely filled, PBT System 110 automatically places another refire order at the same venue in which the earlier refire order was executed if the initial order has sufficient remaining quantity. This subsequent refire order is given the same price as the previously executed refire and is given a quantity that is the greater of a predetermined amount (e.g., 10,000 shares) or an amount calculated based on the previous execution (e.g., twice the amount filled for the previous refire order) up to the remaining quantity of the initial order. In an embodiment of the invention, the predetermined and calculated amounts may be user configurable.

The operations represented in block 1400 may repeat for as long as the initial order has remaining quantity.

In an embodiment of the invention, the operations represented in blocks 1100, 1200, 1300 and 1400 of FIG. 2 may be repeated for different price levels. For example, if an initial order is associated with the single layer bang functionality of Bloomberg TRADEBOOK®, after the operations represented in blocks 1100, 1200, 1300 and 1400 were performed for a first price level, they may be performed again for the next price level, and so on until they are finally performed for the price given to the initial order.

The probing logic described above may be restarted under certain circumstances. Specifically, the probing logic may be restarted under the following conditions: (a) the price of the initial order is modified (e.g., by the user) to be more aggressive (e.g., higher for a bid or lower for an offer); (b) the initial order had no remaining quantity and is modified by adding quantity; or (c) the initial order is associated with single layer bang functionality of Bloomberg TRADEBOOK® or has discretion and the National Best Bid or Offer ("NBBO") changed to make the initial order's price more aggressive.

Where the initial order is a non-marketable order with discretion, the probing logic described above may be restarted under the following conditions: (a) the discretion limit becomes more aggressive (either though user modification or due to a pegged order); (b) the opposite side of the NBBO becomes more aggressive or has its displayed size increased; (c) a predetermined time period (the predetermined time period may be user configurable) has elapsed (e.g., 5 seconds); or a trade executes within the initial order's discretion limit.

The concepts described above are further illustrated in the following example:

EXAMPLE

In this example, PBT System 110 is Bloomberg TradeBook.

The offer side of a TradeBook trading screen shows INET 1000@30.03, SM 1000@30.04

| Time | Event |
|------|-------|
| 10:30:00 | BUY order entered on TradeBook for 30000@30.05 SLB Oversize 1100 to INET, probe 100 to ARCX and 100 to SM, all at 30.03<br>Set SM and ARCX to non probebable from 10:30:00 at limit 30:03<br>Quote 28700 from the initial order on TradeBook using standard anti-lock and display/reserve settings. |
| 10:30:00.1 | SM returns a fill for 100@30.03<br>Decrement quote from 28700 to 18700<br>Refire 10,000@30.03 to SM<br>Set SM to non probable from 10:30:00.1 at limit 30.03 |
| 10:30:00.2 | INET fills for 1000<br>This is a partial fill, and the initial order has quantity remaining, so the probe logic is not restarted again.<br>Increment the quote (e.g., initial order) from 18700 to 18800. |
| 10:30:00.3 | ARCX rejects 100 shares<br>The initial order has remaining quantity, so the probing logic is not restarted again. |
| 10:30:00.4 | ARCX enters a quote at 1000@30.03<br>Reset ARCX to be probeable.<br>Decrement the quote from 18800 to 17700.<br>Oversize 1100@30.03 to ARCX |

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A method for facilitating the trading of financial instruments comprising: at least one computer placing a first order associated with a financial instrument in a venue in which the financial instrument is traded, the first order having terms such that execution of the first order reveals non-public information related to the financial instrument and the venue; and in response to the first order being executed, the at least one computer automatically placing a second order associated with the financial instrument in the venue, the terms of the second order being based on the non-public information revealed by the execution of the first order.

2. The method of claim 1, wherein the non-public information revealed by the execution of the first order describes an undisplayed quantity associated with the financial instrument and the venue.

3. The method of claim 1, wherein the non-public information revealed by the execution of the first order describes an undisplayed price associated with the financial instrument and the venue.

4. A method for facilitating the trading of financial instruments comprising: at least one computer placing a first order associated with a financial instrument and a first of two transaction sides in a venue in which the financial instrument is traded, the first order having a price different from any disclosed prices of orders at the venue associated with the financial instrument and a second transaction side; and in response to the first order being executed for the entire quantity of the first order, the at least one computer automatically placing a second order associated with the financial instrument and the first transaction side in the venue at the same price at which the first order was executed.

5. The method of claim 4, wherein the first order has a first quantity and the second order has a second quantity larger than the first quantity.

6. The method of claim 5, comprising: prior to the at least one computer placing the first order, the at least one computer receiving a third order associated with the financial instrument and the first transaction side, the third order having a third quantity; and wherein the first quantity of the first order is derived from the third quantity of the third order.

7. A method for facilitating the trading of financial instruments comprising: at least one computer placing a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order; and in response to the first order being executed against the second order for the entire quantity of the first order, the at least one computer automatically placing a third order associated with the financial instrument and the first transaction side in the venue at the same price at which the first order was executed.

8. The method of claim 7, wherein the quantity of the third order is greater than the quantity of the first order.

9. The method of claim 8, comprising: prior to the at least one computer placing the first order, the at least one computer receiving a fourth order associated with the financial instrument and the first transaction side; and wherein the quantity of the first order is derived from the quantity of the fourth order.

10. A method for facilitating the trading of financial interests comprising:

at least one computer receiving a first order associated with a financial instrument and a first of two transaction sides, the first order having a first quantity;

the at least one computer determining a price related to the financial instrument based on prices associated with the financial instrument and a second transaction side disclosed by a plurality of venues in which the financial instrument is traded;

the at least one computer placing a quantity probe order associated with the financial instrument and the first transaction side in one venue of the plurality of venues, the quantity probe order having a price identical to the determined price and a quantity which is derived from the first quantity and is greater than the quantity of a second order disclosed in the one venue associated with the financial instrument and a second transaction side having a price identical to the determined price; and the at least one computer placing a price probe order associated with the financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

11. The method of claim 10, wherein, in response to the quantity probe order being executed against the second order for the entire quantity of the probe order, the at least one computer automatically placing a third order associated with the financial instrument and the first transaction side in the venue at the same price at which the quantity probe order was executed.

12. The method of claim 10, wherein, in response to the price probe order being executed for the entire quantity of the price probe order, the at least one computer automatically placing a third order associated with the financial instrument and the first transaction side in the venue at the same price at which the first order was executed.

13. A system for facilitating the trading of financial interests comprising at least one computer programmed to at least: place a first order associated with a financial instrument in a venue in which the financial instrument is traded, the first order having terms such that execution of the first order reveals non-public information related to the financial instrument and the venue; and in response to the first order being executed, automatically place a second order associated with the financial instrument in the venue, the terms of the second order being based on the non-public information revealed by the execution of the first order.

14. A computer readable medium or media having programming stored thereon that when executed by at least one computer causes the at least one computer to perform a method comprising: placing a first order associated with a financial instrument in a venue in which the financial instrument is traded, the first order having terms such that execution of the first order reveals non-public information related to the financial instrument and the venue; and in response to the first order being executed, automatically placing a second order associated with the financial instrument in the venue, the terms of the second order being based on the non-public information revealed by the execution of the first order.

15. A system for facilitating the trading of financial interests comprising at least one computer programmed to at least: placing a first order associated with a financial instrument and a first of two transaction sides in a venue in which the financial instrument is traded, the first order having a price different from any disclosed prices of orders at the venue associated with the financial instrument and a second transaction side; and in response to the first order being executed for the entire quantity of the first order, automatically placing a second order associated with the financial instrument and the first transaction side in the venue at the same price at which the first order was executed.

16. A computer readable medium or media having programming stored thereon that when executed by at least one computer causes the at least one computer to perform a method comprising: placing a first order associated with a financial instrument and a first of two transaction sides in a venue in which the financial instrument is traded, the first order having a price different from any disclosed prices of orders at the venue associated with the financial instrument and a second transaction side; and in response to the first order being executed for the entire quantity of the first order, automatically placing a second order associated with the financial instrument and the first transaction side in the venue at the same price at which the first order was executed.

17. A system for facilitating the trading of financial interests comprising at least one computer programmed to at least: place a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order; and in response to the first order being executed against the second order for the entire quantity of the first order, automatically place a third order associated with the financial instrument and the first transaction side in the venue at the same price at which the first order was executed.

18. A computer readable medium or media having programming stored thereon that when executed by at least one computer causes the at least one computer to perform a method comprising: placing a first order associated with a financial instrument and a first of two transaction sides in a venue in which the financial instrument is traded, the first order having a price identical to a price of a second order previously placed in the venue associated with the financial instrument and a second transaction side, the first order having a quantity greater than the quantity of the second order; and in response to the first order being executed against the second order for the entire quantity of the first order, automatically placing a third order associated with the financial instrument and the first transaction side in the venue at the same price at which the first order was executed.

19. A system for facilitating the trading of financial interests comprising at least one computer programmed to at least:
   receive a first order associated with a financial instrument and a first of two transaction sides, the first order having a first quantity;
   determine a price related to the financial instrument based on prices associated with the financial instrument and a second transaction side disclosed by a plurality of venues in which the financial instrument is traded;
   place a quantity probe order associated with the financial instrument and the first transaction side in one venue of the plurality of venues, the quantity probe order having a price identical to the determined price and a quantity which is derived from the first quantity and is greater than the quantity of a second order disclosed in the one venue associated with the financial instrument and a second transaction side having a price identical to the determined price; and
   place a price probe order associated with the financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

20. A computer readable medium or media having programming stored thereon that when executed by at least one computer causes the at least one computer to perform a method comprising:
   receiving a first order associated with a financial instrument and a first of two transaction sides, the first order having a first quantity;
   determining a price related to the financial instrument based on the prices associated with the financial instrument and a second transaction side disclosed by a plurality of venues in which the financial instrument is traded;
   placing a quantity probe order associated with the financial instrument and the first transaction side in one venue of the plurality of venues, the quantity probe order having a price identical to the determined price and a quantity which is derived from the first quantity and is greater than the quantity of a second order disclosed in the one venue associated with the financial instrument and a second transaction side having a price identical to the determined price; and
   placing a price probe order associated with the financial instrument and the first transaction side in another venue of the plurality of venues, wherein the price probe order has a quantity derived from the first quantity and has a price identical to the determined price and different from any disclosed prices of orders in the other venue associated with the financial instrument and the second transaction side.

* * * * *